United States Patent
Ingle et al.

(10) Patent No.: US 8,464,000 B2
(45) Date of Patent: Jun. 11, 2013

(54) SYSTEMS AND METHODS FOR CACHE LINE REPLACEMENTS

(75) Inventors: Ajay Anant Ingle, Austin, TX (US);
Erich James Plondke, Austin, TX (US);
Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1137 days.

(21) Appl. No.: 12/039,954

(22) Filed: Feb. 29, 2008

(65) Prior Publication Data
US 2009/0222626 A1     Sep. 3, 2009

(51) Int. Cl.
*G06F 12/08*     (2006.01)

(52) U.S. Cl.
USPC ............................................. 711/133; 711/3

(58) Field of Classification Search
USPC ..................................................... 711/3, 133
See application file for complete search history.

(56) References Cited

U.S. PATENT DOCUMENTS

| | | | |
|---|---|---|---|
| 5,875,465 A | 2/1999 | Kilpatrick et al. | |
| 6,405,287 B1 * | 6/2002 | Lesartre | 711/128 |
| 6,408,364 B1 | 6/2002 | Tan et al. | |
| 6,725,337 B1 * | 4/2004 | Tan et al. | 711/133 |
| 2004/0143711 A1 * | 7/2004 | So et al. | 711/144 |

FOREIGN PATENT DOCUMENTS

JP     5189356 A     7/1993

OTHER PUBLICATIONS

John L. Hennessy and David A. Patterson, Computer Organization and Design, 1998, Morgan Kaufmann Publishers, Inc., second edition, p. 549.*
John L. Hennessy and David A. Patterson, Computer Organization and Design, 1998, Morgan Kaufmann Publishers, Inc., second edition, pp. 547,553,573-575.*
International Search Report—PCT/US09/032920, International Search Authority—European Patent Office—Jun. 5, 2009.
Written Opinion—PCT/US09/032920, International Search Authority—European Patent Office—Jun. 5, 2009.

* cited by examiner

*Primary Examiner* — Jared Rutz
(74) *Attorney, Agent, or Firm* — Peter Michael Kamarchik; Nicholas J. Pauley; Joseph Agusta

(57) ABSTRACT

A system for determining a cache line to replace is described. In one embodiment, the system includes a cache comprising a plurality of cache lines. The system further includes an identifier configured to identify a cache line for replacement. The system also includes a control logic configured to determine a value of the identifier selected from an incrementer, a cache maintenance instruction, or remains the same.

20 Claims, 10 Drawing Sheets

SYSTEMS AND METHODS FOR CACHE LINE REPLACEMENTS

FIELD OF THE DISCLOSURE

Embodiments of the inventive concepts disclosed herein relate generally to the field of data processing systems. For example, embodiments of the inventive concepts disclosed herein relate to systems and methods for cache line replacement.

BACKGROUND

In many computing systems today, memory (e.g., Random Access Memory) stores data to be used by the processor in computing instructions. For example, memory may store two operands to be added by a processor and store the result from the summation of the two operands. Thus, in the example, the processor may access the memory to read the two operands and again access the memory to write the result.

Memory may have a slower operating speed than the processor. Therefore, the processor may wait during an access of the memory. Hence, power and time is consumed by the computing device while the processor may be idle waiting for access of the memory. To increase the overall processing speed and reduce power consumption of the computing system, a cache with a faster operating speed than the memory may be coupled to the processor. The cache includes a plurality of cache lines, wherein each cache line may store a portion of the data in memory.

Since the cache is faster than the memory, data that may be used by the processor is preloaded into portions (e.g., cache lines) of the cache. Hence, when the processor is to retrieve data for processing, the processor accesses the cache for the data. If the cache does not include the data, the memory is accessed for the data.

As more data is preloaded into the cache, previously stored data may be replaced with newly computed or retrieved data. As a result, a system may exist that is configured to determine the sequence that cache lines are to be populated and/or replaced. In conventional processors, the cache lines of the cache are used in sequence, wherein the processor loops back to the first cache line once reaching the last cache line of the cache. A system may exist in the processor to determine and point to the next cache line to be used by the processor. One such system implements a First In First Out (FIFO) cache replacement policy, wherein pointers are incremented in order to sequentially point to the next cache line of the cache.

A program may be executed by a processor to include cache maintenance instructions to invalidate a cache line. Since instructions may invalidate cache lines, invalid cache lines may exist in the cache while the system points to a valid cache line to be replaced by the processor. As a result, in a cache implementing a FIFO replacement policy, a valid cache line may be replaced by a load operation while an invalid cache line exists. One problem in this approach is that a decrease in valid cache lines may require the processor to more frequently access the memory, thus causing an increase in power consumption and a decrease in computing speed.

SUMMARY OF THE DISCLOSURE

A system for determining a cache line to replace is described. In one embodiment, the system includes a cache comprising a plurality of cache lines. The system further includes an identifier configured to identify a cache line for replacement. The system also includes a control logic configured to determine a value of the identifier selected from an incrementer, a cache maintenance instruction, or remains the same.

Advantages of one or more embodiments disclosed herein may include power savings and increased processor speed.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to systems and methods for cache line replacement. The conventional system 100 illustrated in the schematic of FIG.

1 may be modified in order to reduce the number of invalid cache lines existing in the cache. As a result, less cache misses may exist. Hence, the processor may access the memory less during operation.

Conventional Cache Replacement System

Figure 1:
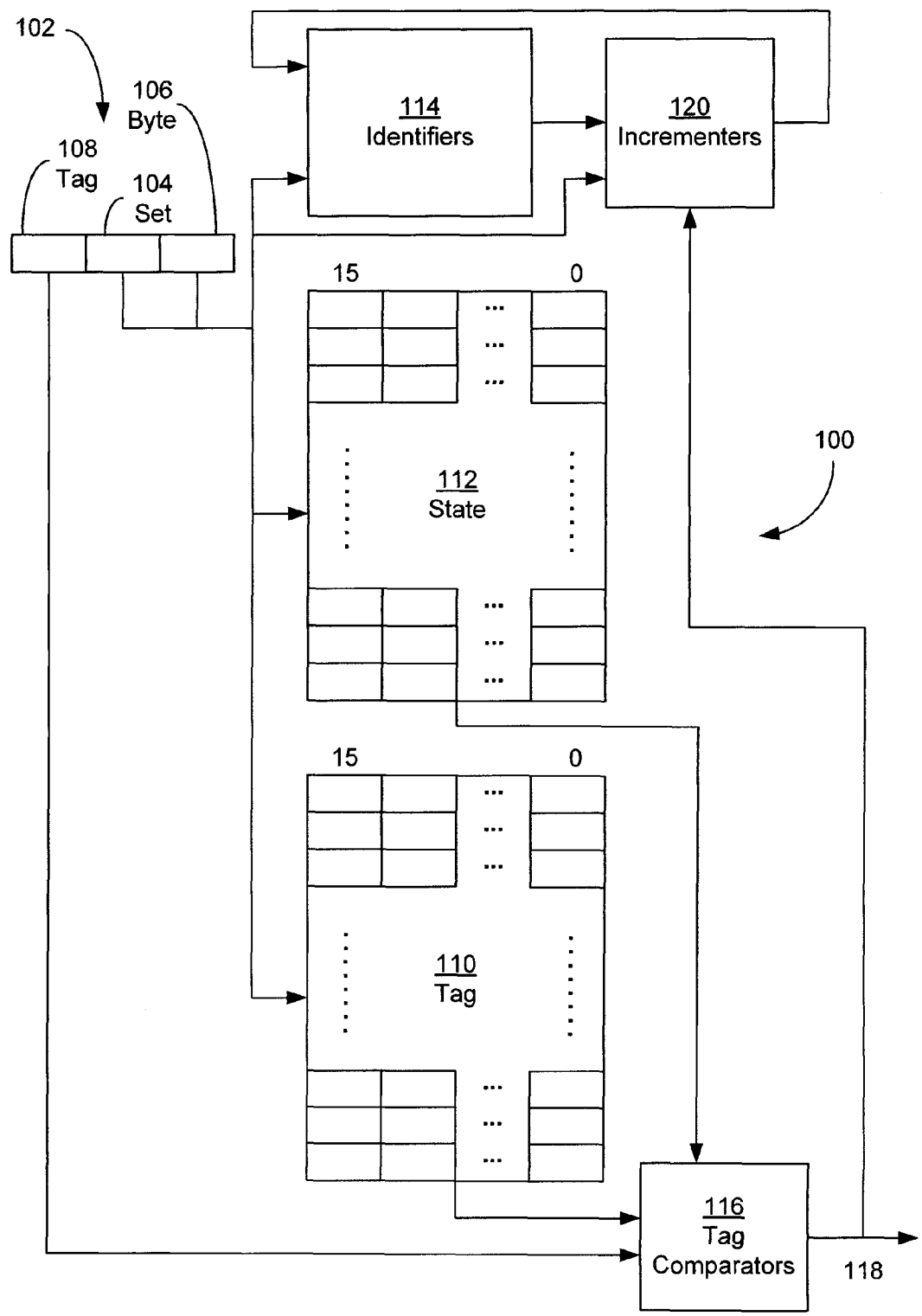
FIG. 1 is a prior art schematic illustrating a conventional system for determining cache lines for replacement.

FIG. 1 is a schematic illustrating a conventional system 100 for determining cache lines for replacement. In the system 100, the processor is configured sequentially to proceed through the cache in replacing the data stored in the cache lines.

As illustrated in the schematic of FIG. 1, the system 100 includes a tag storage 110 and a state storage 112. The tag storage 110 and state storage 112 may be arrays including the same number of sets (e.g., rows) and ways (e.g., column). Each cell of the state and tag arrays 110, 112 corresponds to a cache line of the cache of the processor. In system 100, each set includes sixteen ways (0-15), which may correspond to sixteen data cache lines that may be independently read and written from/to by the processor.

Each cell of the tag array 110 stores a tag. The tag may be an address of a memory location presently corresponding to a cache line. For example, a cache line may store data from a memory location with memory address A. Hence, the corresponding tag cell stores memory address A. Each cell of the state array 112 stores the state (e.g., valid or invalid) of the corresponding cache line. Continuing the above example, if the stored value in the cache line is valid, then the state cell stores information indicating that the cache line is valid. The program to be executed by a processor may include cache maintenance instructions that may include instructions to invalidate a cache line by either directly pointing to the cache line to be invalidated or pointing to the tag for which the cache line storing the value of memory corresponding to the tag is to be invalidated. To invalidate the cache line, the system 100 may store an invalid state in the corresponding cell of state array 112.

The system 100 further includes a plurality of identifiers 114 (e.g., pointers). The number of identifiers 114 corresponds to the number of sets in the tag and state arrays 110, 112. Furthermore, since the number of ways per set is 16 in system 100, each identifier may be four bits. Thus, each FIFO may be configured to point to any of the sixteen ways of its respective set, hence being able to point to the sixteen cache lines associated with the set.

In system 100, when an instruction 102 is to be executed by the processor, the instruction 102 may be received by the system 100. The instruction 102 may include a set 104, a byte 106, and a tag 108. The byte 106 may be the type of operation to be performed by the processor executing the instruction (e.g., load, add, etc.). If the instruction is a load or store, then the set 104 may be the set from which the value of one of the sixteen cache lines may be loaded are stored. The tag 108 is the memory address of the memory storing the value for which the instruction is to include. In an example, if the instruction is load operand A, the instruction may include the set 104 for where to store operand A in cache, the byte 106 that the instruction is a load instruction, and tag 108 for where operand A is stored in the memory.

System 100 further includes incrementers 120. In system 100, an incrementer exists for each of the identifiers 114. The next way of a set of a cache to be loaded is pointed to by the corresponding identifier 114 for the set. Then, when a value is loaded to the way of set 104 of the cache, then the incrementer 120 for the identifier 114 of set 104 increments the identifier to point to the next way of the set of the cache. Upon incrementing to the last way of the set, the incrementer may roll over the value (e.g., 15 to 0) in order to point to the first way of the set. Therefore, cache lines are sequentially loaded.

If the instruction 102 is not a load instruction, then the system 100 determines if the tag 108 of the instruction 102 is stored in the tag array 110. If the tag 108 is stored in the tag array 110, then the memory value of the memory location corresponding to the tag 108 may be stored. The storage location may be the respective cache line for the cell of the tag array 110 where the tag 108 is stored.

System 100 includes tag comparators 116 to determine whether a memory value stored in the memory location corresponding to tag 108 is stored in a cache line of the cache. A tag comparator may exist for each way (e.g., column) of the tag and state arrays. Hence, for system 100, sixteen tag comparators may exist in 116. For its corresponding way, the tag comparator compares the tag 108 to the tag stored for the way of set 104 in tag array 110. The tag comparator further determines if the tag stored in tag array 110 is valid by accessing the state of the cell of state array 112 corresponding to the cell of the tag array 110. If none of the sixteen comparators finds a match between tags with a valid state, the tag comparators 116 may output a miss signal 118 that the memory value is not stored in cache. Thus, the value may be loaded from memory into the cache. If one of the sixteen comparators finds a match between tags with a valid state, the tag comparators 116 may output a hit signal 118 that the memory value is stored in the cache. Thus, the processor may access the cache instead of accessing the memory.

If the instruction 102 is a load instruction, the system 100 may access the identifier 114 for the set 104 to determine which cache line is to be loaded. The identifier 114 is then incremented in order to point to the next cache line to be loaded.

Since instructions may exist to invalidate cache lines of the cache, an invalid cache line may exist while the corresponding identifier points to a different cache line of the cache. As a result, in a processor including the conventional system 100, a valid cache line may be replaced by a load operation while an invalid cache line exists.

Cache Maintenance Instructions

Cache maintenance instructions may include an invalidate by index instruction and an invalidate by address instruction. An invalidate by index instruction includes an index of the cache to be invalidated. Therefore, the instruction specifically points to a cache line to be invalidated. Hence, when a processor executes the invalidate by index instruction, the cell of the state array corresponding to the indexed cache line stores an invalid status.

An invalidate by address instruction includes an address of the memory (e.g., tag). Therefore, when a processor executes the invalidate by address instruction, the processor is to invalidate the cache line associated with the memory address. Hence, the processor searches for the memory address in the tag array and invalidates the cache line associated with the tag cell storing the matching tag.

In the exemplary system 200 (FIG. 2) and the exemplary system 300 (FIG. 3), for a cache line invalidated via an invalidate instruction, the system 200, 300 may cast the identifier corresponding to the set for the invalidated cache line such that the identifier points to the invalidated cache line. As a result, an invalidated cache line replaced before a valid cache line of the same set.

Illustrative Embodiments of A Cache Replacement System

Figure 2:
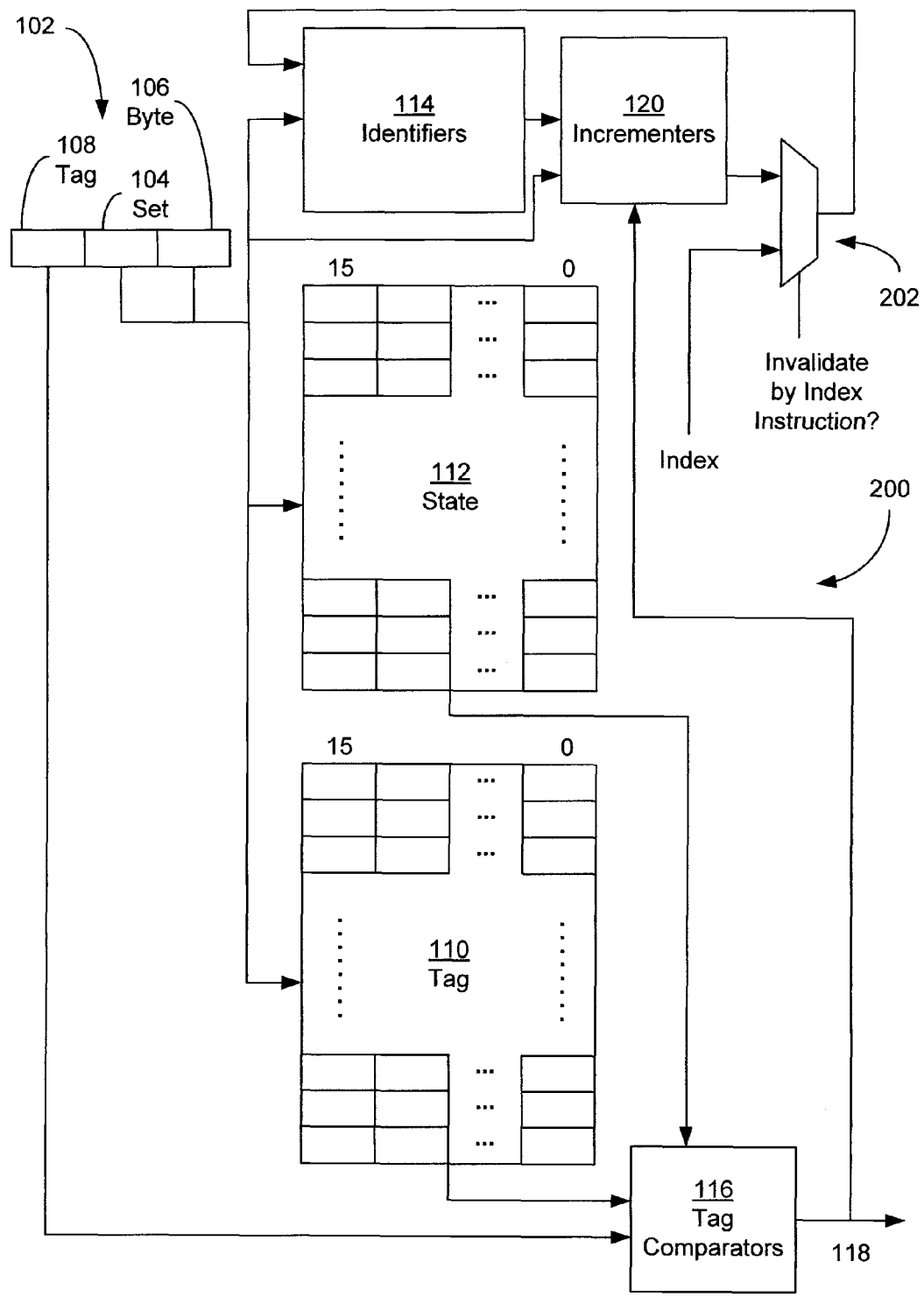
FIG. 2 is a schematic illustrating an exemplary system for determining cache lines for replacement wherein invalidate by index instructions exist.
Figure 3:
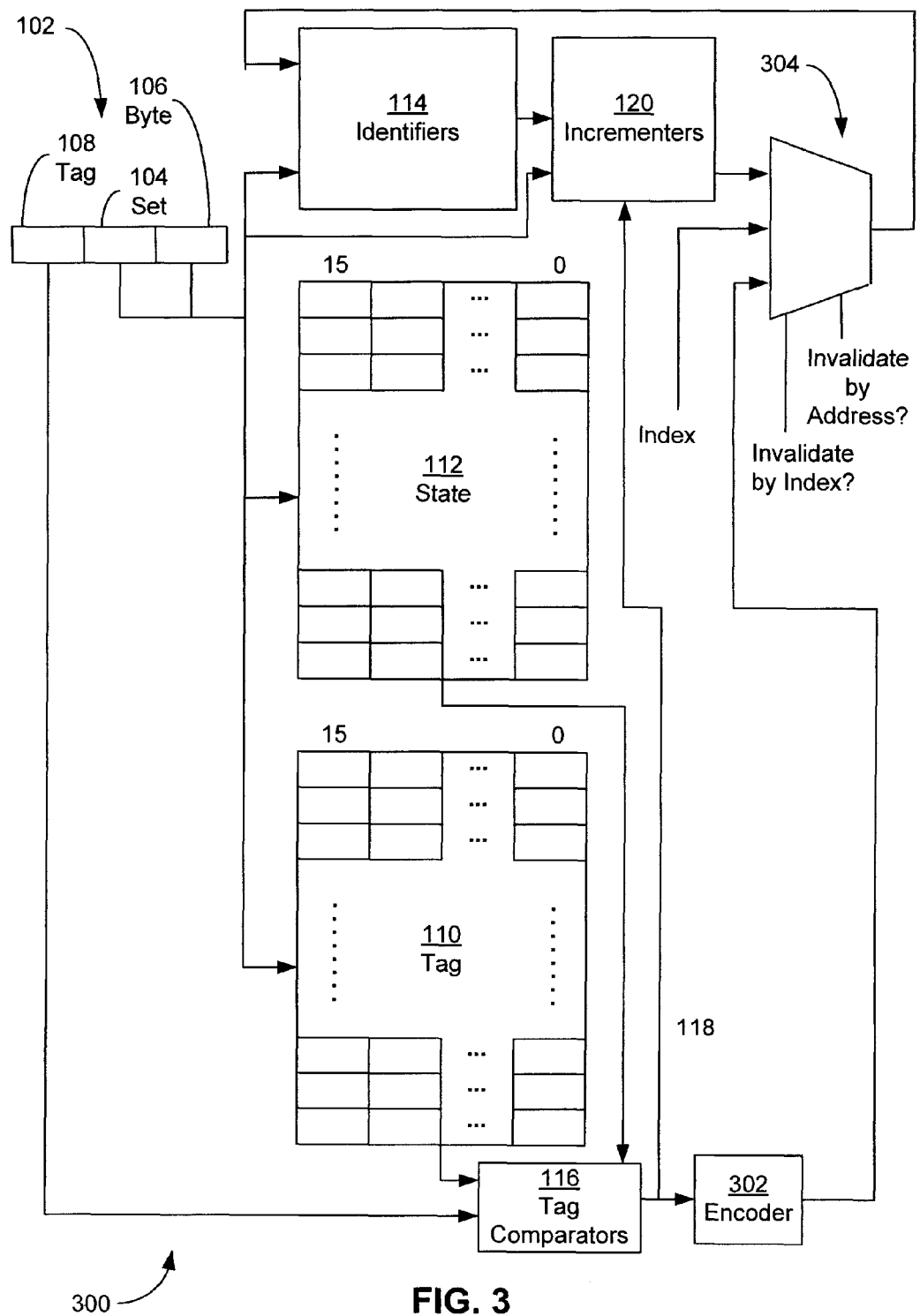
FIG. 3 is a schematic illustrating an exemplary system for determining cache lines for replacement wherein invalidate by index instructions and invalidate by address instructions exist.

The schematics in FIGS. 2-3 illustrate exemplary embodiments of systems for replacing cache lines. The schematic of FIG. 2 illustrates an exemplary system 200 for determining cache lines of a cache for replacement wherein invalidate by index instructions exist during operation of the processor. The schematic of FIG. 3 illustrates an exemplary system 300 for determining cache lines of a cache for replacement wherein invalidate by index instructions and invalidate by address instructions exist during operation of the processor.

Referring to FIG. 2, system 200 includes a selector 202 as compared to system 100 of FIG. 1. During processing of non maintenance instructions, selector 202 selects the incremented identifier value (i.e., the output of incrementers 120). Hence, system 200 may operate similar to system 100 in FIG. 1. For example, during a load operation, the system 200 uses the set 104 of instruction 102 to select the identifier 114, set of the state array 112, and set of the tag array 110. The processor then loads the value stored in the tag 108 of memory into the cache line identified by the set 104 and the identifier 114. Since byte 106 shows that the instruction is a load instruction, the incrementer 120 receiving the byte 106 increments the selected identifier 114 to point to the next cache line of the set. The selector 202 then selects the output of the incrementer (the incremented identifier value) since the instruction is not a cache maintenance/invalidate by index instruction. The identifier 114 then stores the incremented identifier value.

In another example, during a store operation, the system 200 uses the set 104 of instruction 102 to select the identifier 114, set of the state array 112, and set of the tag array 110. The processor sends the value of the cache line corresponding to the set 104 and a predetermined way to the memory location of memory identified by tag 108 for storage. Since the instruction is neither a load instruction nor requires a value from memory in order to be executed by the processor, the incrementer 120 does not increment the identifier value. Since the instruction is not an invalidate by index instruction, selector 202 selects the output of the incrementer 120. Therefore, the identifier value of the identifier stays the same during execution of the store instruction.

Some instructions, such as add or multiply, may include operands that are to be used for execution of the instruction. The operand is conventionally stored in memory. Hence, the operand may be stored in cache. Therefore, the system 200 may determine if the operand is stored in cache. Similar to system 100 in FIG. 1, if the operand is stored in cache, a hit signal 118 is output from tag comparators 116. If the operand is not stored in cache, a miss signal 118 is output from the tag comparators 116. The hit or miss signal 118 is routed to the incrementers 120 to help control whether the incrementer 120 is to increment an identifier value.

If the signal 118 is a miss, then the operand is not stored in cache and needs to be loaded from memory to cache. Therefore, the identifier 114 for set 104 identifies the next cache line to be replaced. The operand is loaded into the identified cache line. Upon receiving the miss signal 118, incrementer 120 increments the identifier value in order to point to the next cache line after the replaced cache line. If the signal 118 is a hit, then the operand does not need to be loaded from memory to cache. Therefore, upon receiving the hit signal 118, the incrementer 120 does not change the identifier value.

The operation of system 200 diverts from the operation of system 100 (FIG. 1) during execution of cache maintenance instructions (e.g., cache invalidation instructions). When a cache maintenance instruction is executed, the selector 202 selects the index input from the instruction. The processor also invalidates the indexed cache line. Since the selector 202 selects the index from the instruction, the identifier 114 for the indexed cache line equals the index in order to point to the invalidated cache line. As a result, when a cache line is invalidated, the system 200 sets the invalidated cache line as the next cache line of a set to be replaced.

Referring to FIG. 3, invalidation may be performed by index or by address. Therefore, as compared to system 100 in FIG. 1, system 300 includes an encoder 302 and selector 304. Like system 200 in FIG. 2, system 300 operates similar to system 100 of FIG. 1 during execution of non maintenance instructions. When a maintenance instruction is executed, though, the maintenance instruction may be an invalidate by index instruction or an invalidate by address instruction. If the cache maintenance instruction is an invalidate by index instruction, then the selector 304 selects the index from the instruction 102 and system 300 operates like system 200 in FIG. 2.

If the cache maintenance instruction is an invalidate by address instruction, then the selector 304 selects an output of encoder 302. As previously described, an invalidate by address instruction includes a memory address for which the processor is to find a cache line associated with the memory location of tag 108 and invalidate the cache line. Therefore, encoder 302 may be configured to output the identifier value of the cache line in set 104 associated with the memory location of tag 108 of memory so that the identifier points to the invalidated cache line for replacement by the processor.

A tag comparator exists for each way of a set of the tag array. Therefore, in the illustrative embodiment, sixteen tag comparators may exist. As previously stated, if the tag comparator has a match of tags that is valid, the tag comparator outputs a hit signal. In one embodiment, if a comparator matches tags and receives a valid state from the corresponding cell in state array 112, then the comparator outputs a one. Only one cache line in a set may be associated with a memory address (tag 108). Therefore, the outputs of the sixteen tag comparators for a set 104 may be: (i) sixteen zeros (i.e., one zero from each tag comparator) denoting a miss or (ii) fifteen zeros and one one (i.e., one one from the tag comparator matching tags and receiving a valid state and one zero from each of the remaining fifteen tag comparators) denoting a hit. Thus, the sixteen bits are sent from the tag comparators 116 to encoder 302.

In one embodiment, the encoder 302 is configured to encode the received sixteen bit values into a four bit identifier value. For example, if the tag comparator for way 10 (from way 0-15) of set 104 is one, then the encoder may output "1010." In another example, if way 3 is one, then the encoder 302 may output "0011." Therefore, identifier value output by encoder 302 is selected by selector 304 and stored by identifier 114 such that the invalidated cache line is pointed to as being the next cache line to be replaced.

Exemplary Methods of Operation of the Cache Replacement Systems

Figure 4:
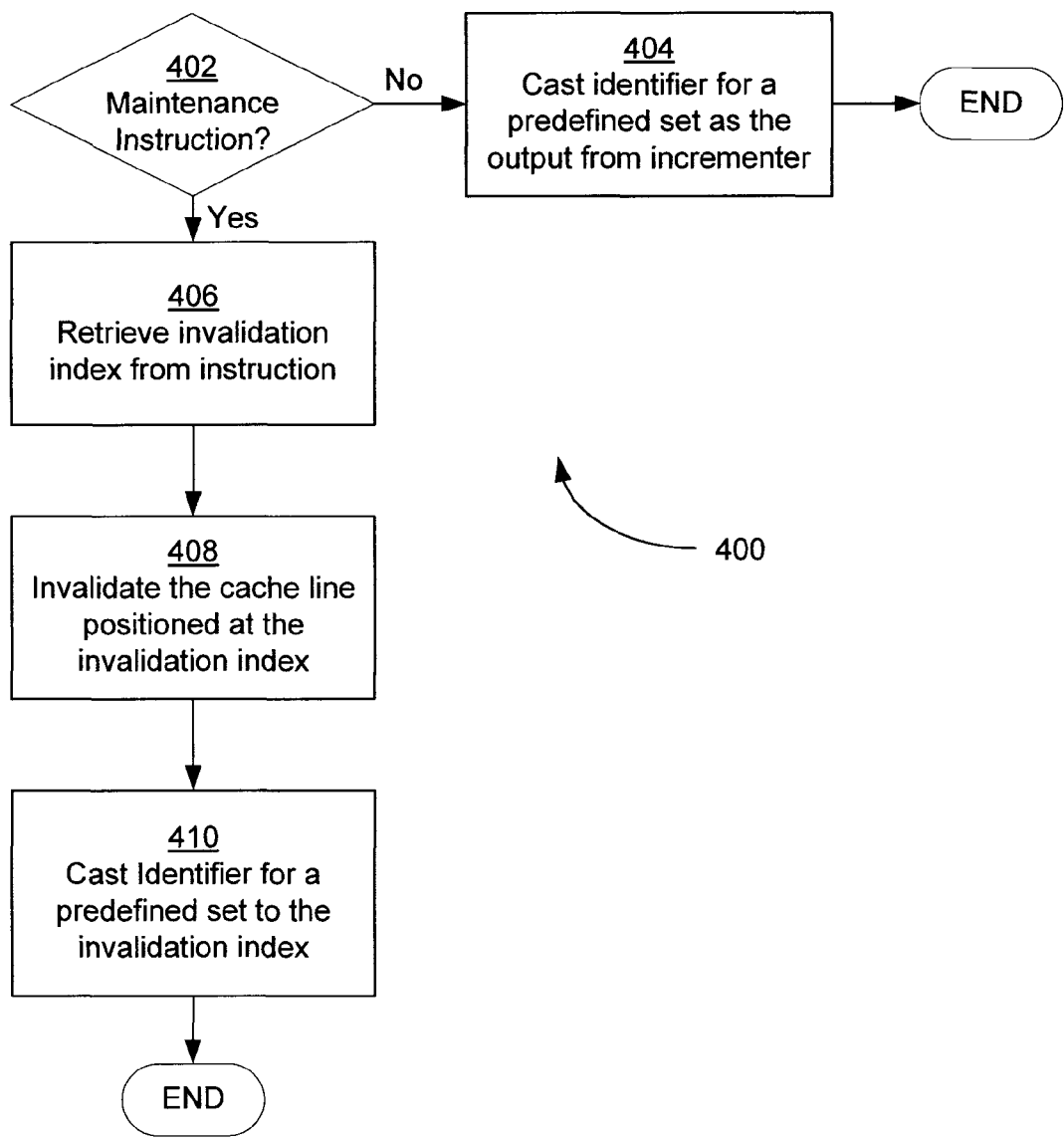
FIG. 4 is a flowchart illustrating an exemplary method of operation of the system illustrated in the schematic of FIG. 2.
Figure 5:
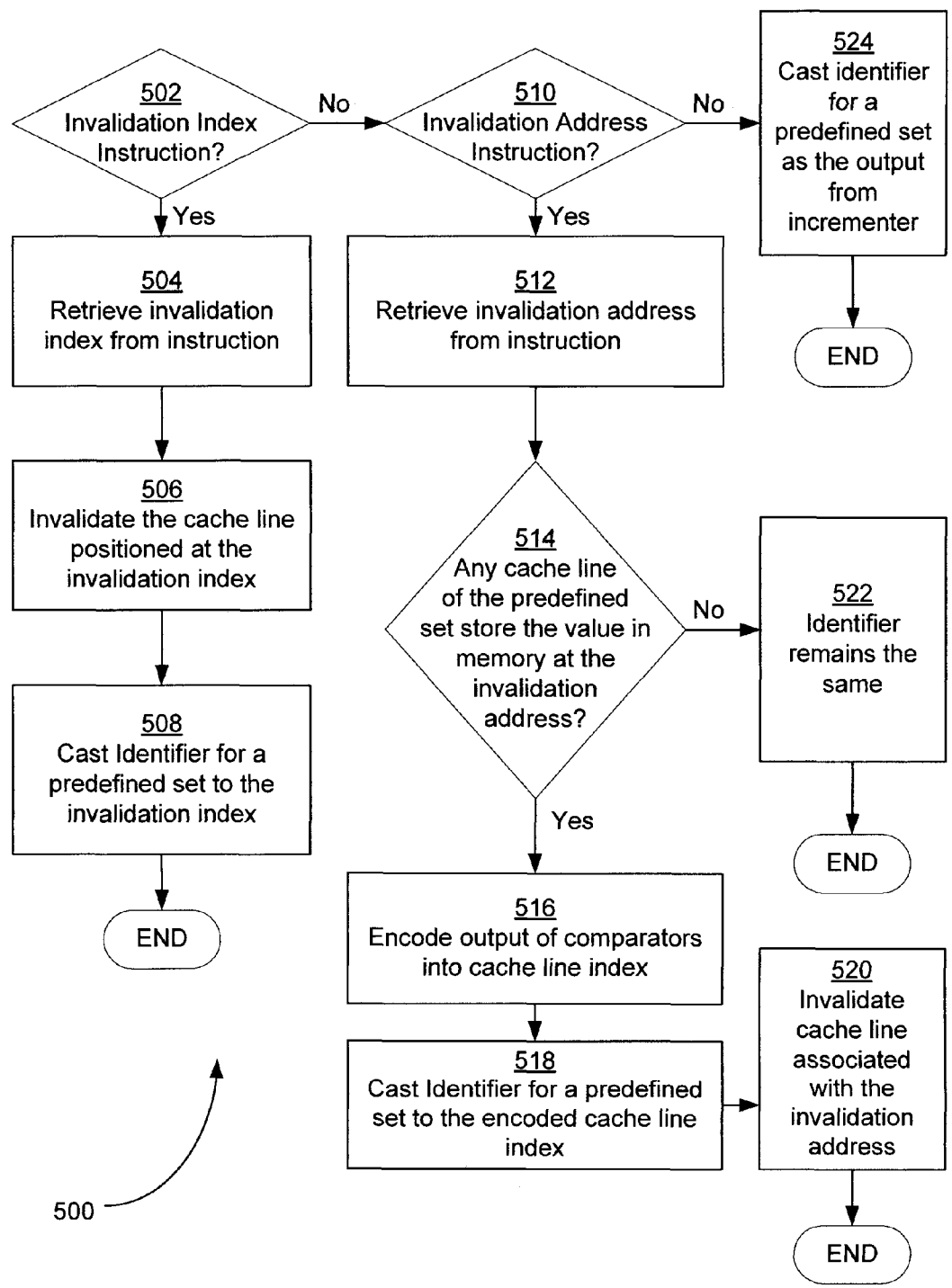
FIG. 5 is a flowchart illustrating an exemplary method of operation of the system illustrated in the schematic of FIG. 3.

FIGS. 4-5 are flowcharts illustrating exemplary methods of operation of the cache replacement systems 200, 300. FIG. 4 is a flowchart illustrating an exemplary method 400 of operation of the system 200 illustrated in the schematic of FIG. 2. FIG. 5 is a flowchart illustrating an exemplary method 500 of operation of the system 300 illustrated in the schematic of FIG. 3.

Referring to FIG. 4, the system 200 determines if the instruction to be executed is a cache maintenance instruction in 402. The cache maintenance instruction for system 200 is an invalidate by index instruction. If the instruction is not a cache maintenance instruction, then the system 200 casts the identifier for the set 104 as the output of the incrementer 120 in 404. In one embodiment, the selector 202 selects the output of the incrementer 120 to feed the value back into the identifiers 114. If the incrementer 120 receives a hit signal 118 from the tag comparator 116, then the incrementer 120 does not increment the identifier value. If the incrementer 120 receives a miss signal 118, then the incrementer 120 increments the identifier value. Hence, the identifier for set 104 either remains the same or is incremented.

If the instruction is a cache maintenance instruction, then the system 200 retrieves the invalidation index from the instruction 102. The cache line positioned at the index is then invalidated in 408. Proceeding to 410, the system 200 casts the identifier for the set 104 as the index from the instruction. In one embodiment, the selector 202 selects the index from the instruction to feed back into the identifiers 114. Hence, the identifier points to the invalidated cache line as the next cache line to be replaced.

Referring to FIG. 5 in reference to system 300 in FIG. 3, the system 300 determines if the instruction to be executed is a cache maintenance instruction (502 and 510). A cache maintenance instruction for system 300 may be an invalidate by index instruction or an invalidate by address instruction. Hence, beginning in 502, the system 300 determines if the instruction is an invalidate by index instruction. If the instruction is an invalidate by index instruction, then the system 300 retrieves the invalidation index from the instruction 102 in 504. The cache line positioned at the index is then invalidated in 506. Proceeding to 508, the system 200 casts the identifier for the set 104 as the index from the instruction. In one embodiment, the selector 304 selects the index from the instruction to feed back into the identifiers 114. Hence, the identifier points to the invalidated cache line as the next cache line to be replaced.

If the instruction is not an invalidate by index instruction, then the system 300 determines if the instruction is a cache invalidate by address instruction in 510. If the instruction is an invalidate by address instruction, then the system 300 retrieves the invalidation memory address (e.g., tag 108) from the instruction 102 in 512. Proceeding to 514, the system 300 determines if any cache line for set 104 stores the value in memory at the memory address (e.g., tag 108) retrieved from instruction 102.

If the system 300 determines that a cache line stores the value from memory at the address, then the encoder 302 of system 300 encodes the output from tag comparators 116 to create a cache line index (e.g., a four bit identifier value pointing to the cache line that is invalidated) in 516. Proceeding to 518, the system 300 casts the identifier for set 104 to the encoded value such that the identifier of set 104 points to the cache line to be invalidated. The cache line is invalidated in 520.

If the system 300 determines that the value stored in memory location of the invalidation address is not stored in cache in 514, then the identifier 114 for set 104 remains the same since none of the cache lines are invalidated in 522. Referring back to 510, if the instruction is not an invalidate by address instruction, then the instruction is not a cache maintenance instruction. Therefore, the system 300 casts the identifier for the set 104 as the output of the incrementer 120 in 524. In one embodiment, the selector 304 selects the output of the incrementer 120 to feed the value back into the identifiers 114. If the incrementer 120 receives a hit signal 118 from the tag comparator 116, then the incrementer 120 does not increment the identifier value. If the incrementer 120 receives a miss signal 118, then the incrementer 120 increments the identifier value. Hence, the identifier for set 104 either remains the same or is incremented.

Example Devices Including the Cache Replacement System

Multi-mode register files may be included in any processors including register files, such as digital signal processors. The general diagrams of FIGS. 6-10 illustrate example devices that may incorporate a cache replacement system to replace invalidated cache lines as illustrated in the schematics of FIGS. 2 and 3.

Figure 6:
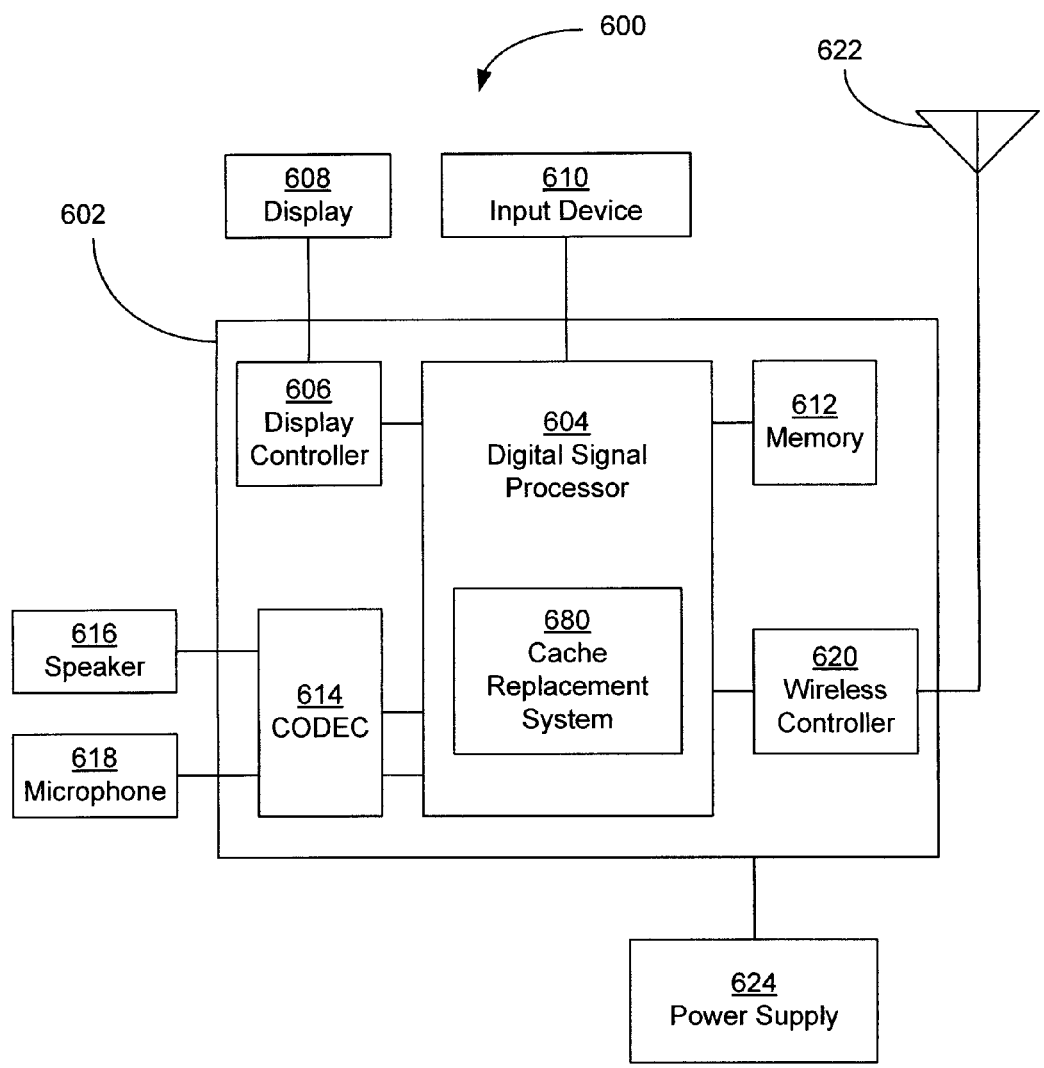
FIG. 6 is a general diagram illustrating an example portable communication device incorporating a digital signal processor that may include a cache replacement system as illustrated in FIGS. 2-3.

FIG. 6 is a diagram illustrating an exemplary embodiment of a portable communication device 600. As illustrated in the general diagram of FIG. 6, the portable communication device includes an on-chip system 602 that includes a digital signal processor (DSP) 604. The general diagram of FIG. 6 also shows a display controller 606 that is coupled to the digital signal processor 604 and a display 608. Moreover, an input device 610 is coupled to the DSP 604. As shown, a memory 612 is coupled to the DSP 604. Additionally, a coder/decoder (CODEC) 614 may be coupled to the DSP 604. A speaker 616 and a microphone 618 may be coupled to the CODEC 614.

The general diagram of FIG. 6 further illustrates a wireless controller 620 coupled to the digital signal processor 604 and a wireless antenna 622. In a particular embodiment, a power supply 624 is coupled to the on-chip system 602. Moreover, in a particular embodiment, as illustrated in FIG. 6, the display 626, the input device 630, the speaker 616, the microphone 618, the wireless antenna 622, and the power supply 624 are external to the on-chip system 602. However, each is coupled to a component of the on-chip system 602.

In a particular embodiment, the DSP 604 includes a cache replacement system 680 to determine which cache lines of a cache of the DSP 604 to replace with values from memory 612.

Figure 7:
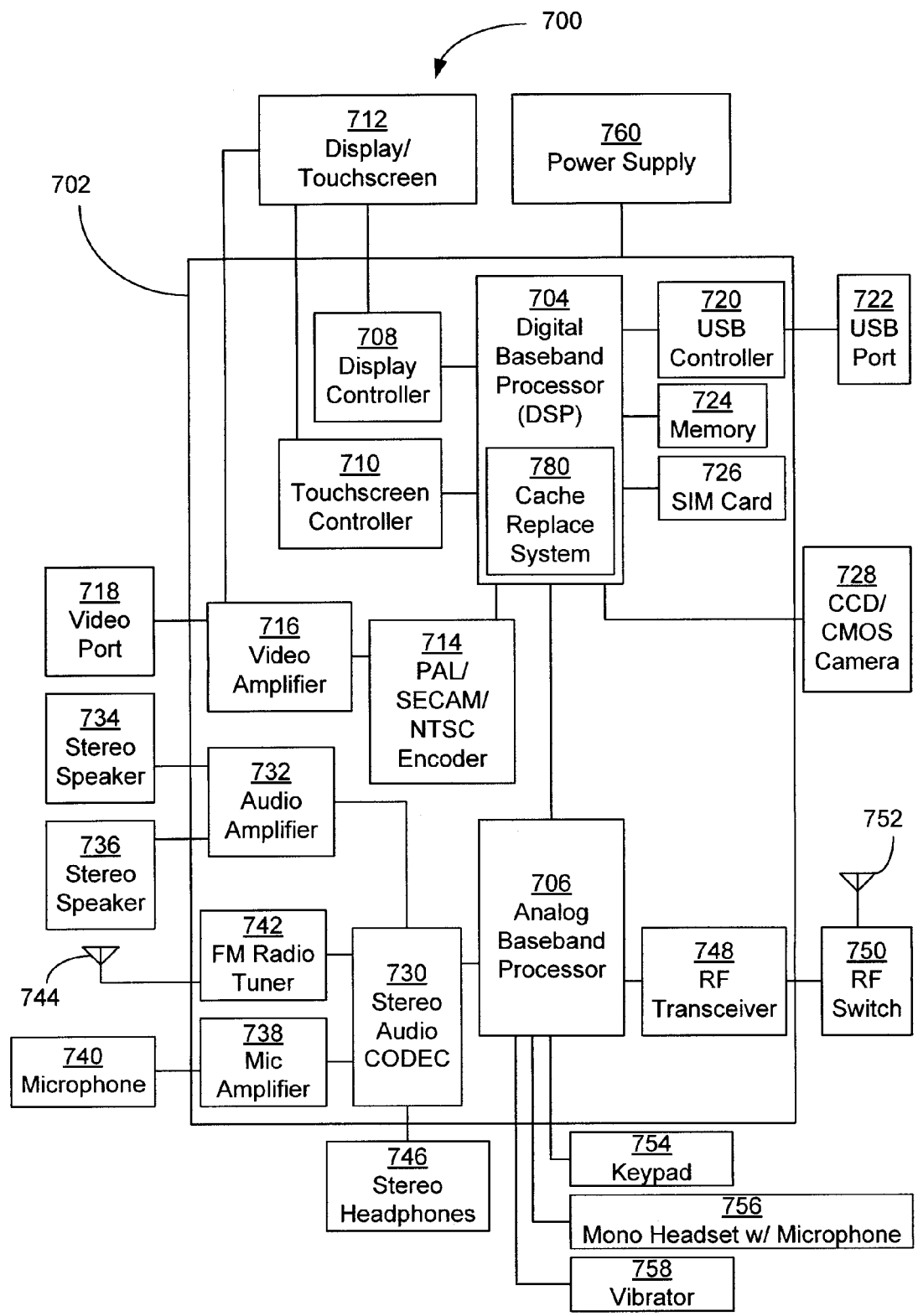
FIG. 7 is a general diagram illustrating an example cellular telephone incorporating a digital signal processor that may include a cache replacement system as illustrated in FIGS. 2-3.

FIG. 7 is a diagram illustrating an exemplary embodiment of a cellular telephone 700. As shown, the cellular telephone 700 includes an on-chip system 702 that includes a digital baseband processor 704 and an analog baseband processor 706 that are coupled together. In a particular embodiment, the digital baseband processor 704 is a digital signal processor. As illustrated in the general diagram of FIG. 7, a display controller 708 and a touchscreen controller 710 are coupled to the digital baseband processor 704. In turn, a touchscreen display 712 external to the on-chip system 702 is coupled to the display controller 708 and the touchscreen controller 710.

The general diagram of FIG. 7 further illustrates a video encoder 714, e.g., a phase alternating line (PAL) encoder, a sequential couleur a memoire (SECAM) encoder, or a national television system(s) committee (NTSC) encoder, is coupled to the digital baseband processor 704. Further, a video amplifier 716 is coupled to the video encoder 714 and the touchscreen display 712. Also, a video port 718 is coupled to the video amplifier 716. As depicted in the general diagram of FIG. 7, a universal serial bus (USB) controller 720 is coupled to the digital baseband processor 704. Also, a USB port 722 is coupled to the USB controller 720. A memory 724 and a subscriber identity module (SIM) card 726 may also be coupled to the digital baseband processor 704. Further, as shown in the general diagram of FIG. 7, a digital camera 728 may be coupled to the digital baseband processor 704. In an exemplary embodiment, the digital camera 728 is a chargecoupled device (CCD) camera or a complementary metal-oxide semiconductor (CMOS) camera.

As further illustrated in the general diagram of FIG. 7, a stereo audio CODEC 730 may be coupled to the analog baseband processor 706. Moreover, an audio amplifier 732 may coupled to the stereo audio CODEC 730. In an exemplary embodiment, a first stereo speaker 734 and a second stereo speaker 736 are coupled to the audio amplifier 732. A microphone amplifier 738 may be also coupled to the stereo audio CODEC 730. Additionally, a microphone 740 may be coupled to the microphone amplifier 738. In a particular embodiment, a frequency modulation (FM) radio tuner 742 may be coupled to the stereo audio CODEC 730. Also, an FM antenna 744 is coupled to the FM radio tuner 742. Further, stereo headphones 746 may be coupled to the stereo audio CODEC 730.

The general diagram of FIG. 7 further illustrates a radio frequency (RF) transceiver 748 may be coupled to the analog baseband processor 706. An RF switch 750 may be coupled to the RF transceiver 748 and an RF antenna 752. A keypad 754 may be coupled to the analog baseband processor 706. Also, a mono headset with a microphone 756 may be coupled to the analog baseband processor 706. Further, a vibrator device 758 may be coupled to the analog baseband processor 706. The general diagram of FIG. 7 also shows a power supply 760 may be coupled to the on-chip system 702. In a particular embodiment, the power supply 760 is a direct current (DC) power supply that provides power to the various components of the cellular telephone 700. Further, in a particular embodiment, the power supply is a rechargeable DC battery or a DC power supply that is derived from an alternating current (AC) to DC transformer that is coupled to an AC power source.

As depicted in the general diagram of FIG. 7, the touchscreen display 712, the video port 718, the USB port 722, the camera 728, the first stereo speaker 734, the second stereo speaker 736, the microphone 740, the FM antenna 744, the stereo headphones 746, the RF switch 750, the RF antenna 752, the keypad 754, the mono headset 756, the vibrator 758, and the power supply 760 may be external to the on-chip system 702. In a particular embodiment, the Digital Baseband Processor 704 includes a cache replacement system 780 to determine which cache lines of a cache of the processor 704 to replace with values from memory 724.

Figure 8:
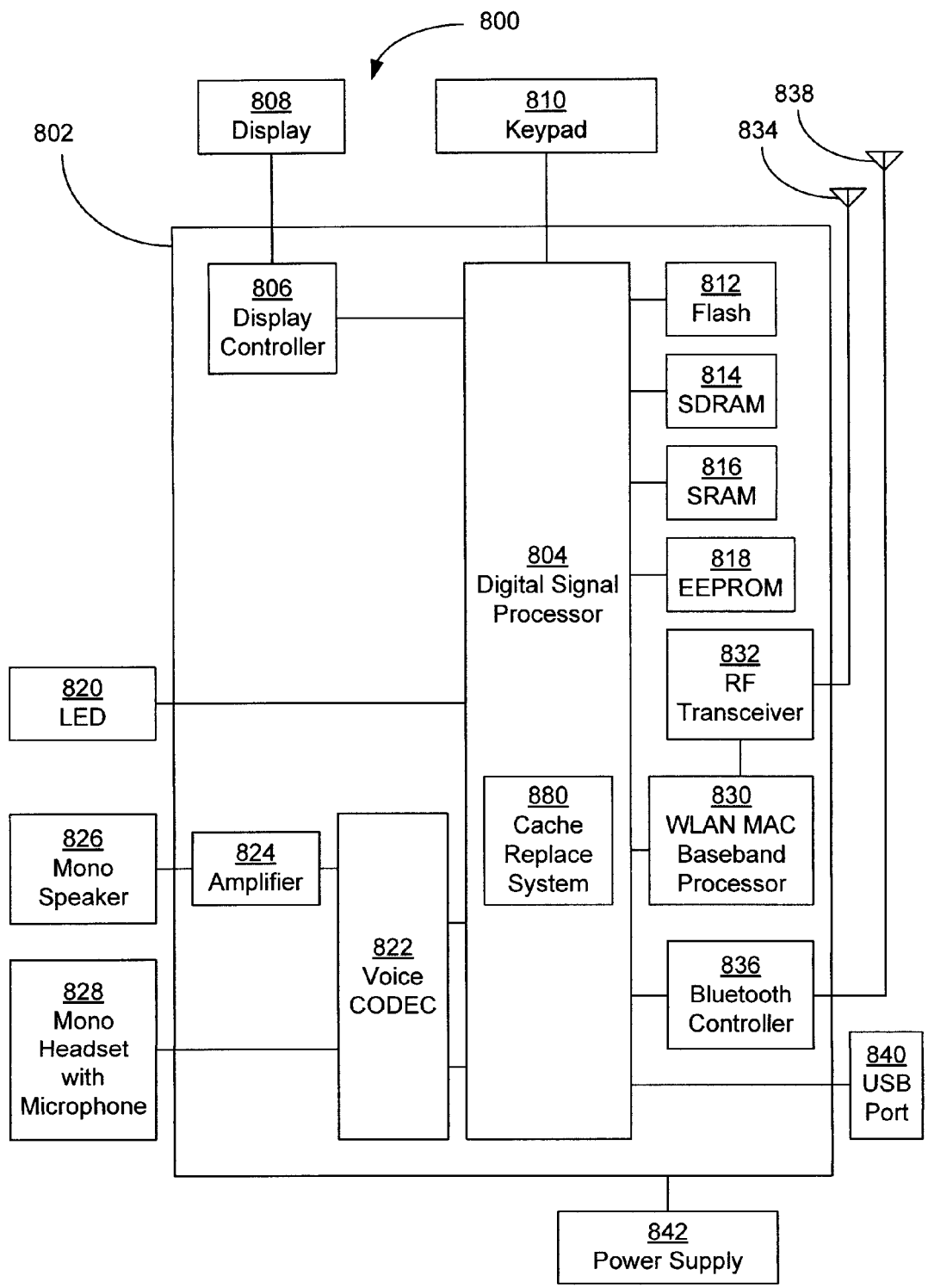
FIG. 8 is a general diagram illustrating an example wireless Internet Protocol telephone incorporating a digital signal processor that may include a cache replacement system as illustrated in FIGS. 2-3.

FIG. 8 is a diagram illustrating an exemplary embodiment of a wireless Internet protocol (IP) telephone 800. As shown, the wireless IP telephone 800 includes an on-chip system 802 that includes a digital signal processor (DSP) 804. A display controller 806 may be coupled to the DSP 804 and a display 808 is coupled to the display controller 806. In an exemplary embodiment, the display 808 is a liquid crystal display (LCD). FIG. 8 further shows that a keypad 810 may be coupled to the DSP 804.

A flash memory 812 may be coupled to the DSP 804. A synchronous dynamic random access memory (SDRAM) 814, a static random access memory (SRAM) 816, and an electrically erasable programmable read only memory (EEPROM) 818 may also be coupled to the DSP 804. The general diagram of FIG. 8 also shows that a light emitting diode (LED) 820 may be coupled to the DSP 804. Additionally, in a particular embodiment, a voice CODEC 822 may be coupled to the DSP 804. An amplifier 824 may be coupled to the voice CODEC 822 and a mono speaker 826 may be coupled to the amplifier 824. The general diagram of FIG. 8 further illustrates a mono headset 828 coupled to the voice CODEC 822. In a particular embodiment, the mono headset 828 includes a microphone.

A wireless local area network (WLAN) baseband processor 830 may be coupled to the DSP 804. An RF transceiver 832 may be coupled to the WLAN baseband processor 830 and an RF antenna 834 may be coupled to the RF transceiver 832. In a particular embodiment, a Bluetooth controller 836 may also be coupled to the DSP 804 and a Bluetooth antenna 838 may be coupled to the controller 836. The general diagram of FIG. 8 also shows that a USB port 840 may also be coupled to the DSP 804. Moreover, a power supply 842 is coupled to the on-chip system 802 and provides power to the various components of the wireless IP telephone 800.

As indicated in the general diagram of FIG. 8, the display 808, the keypad 810, the LED 820, the mono speaker 826, the mono headset 828, the RF antenna 834, the Bluetooth antenna 838, the USB port 840, and the power supply 842 may be external to the on-chip system 802 and coupled to one or more components of the on-chip system 802. In a particular embodiment, the Digital Signal Processor 804 includes a cache replacement system 880 to determine which cache lines of a cache of the processor 804 to replace with values from flash 812, SDRAM 814, SRAM 816, and/or EEPROM 818.

Figure 9:
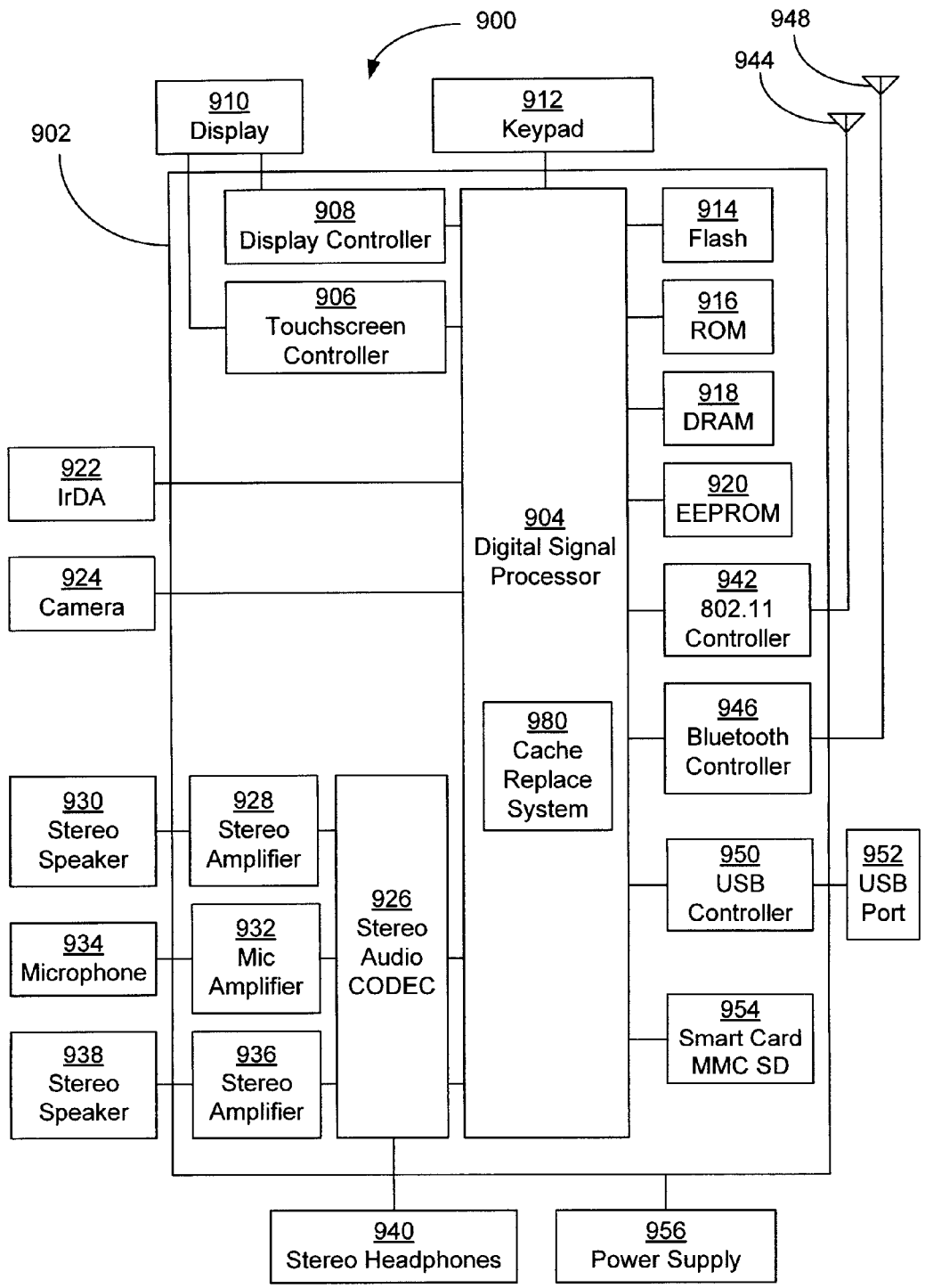
FIG. 9 is a general diagram illustrating an example portable digital assistant incorporating a digital signal processor that may include a cache replacement system as illustrated in FIGS. 2-3.

FIG. 9 is a diagram illustrating an exemplary embodiment of a portable digital assistant (PDA) 900. As shown, the PDA 900 includes an on-chip system 902 that includes a digital signal processor (DSP) 904. A touchscreen controller 906 and a display controller 908 are coupled to the DSP 904. Further, a touchscreen display 910 is coupled to the touchscreen controller 906 and to the display controller 908. The general diagram of FIG. 9 also indicates that a keypad 912 may be coupled to the DSP 904.

In a particular embodiment, a stereo audio CODEC 926 may be coupled to the DSP 904. A first stereo amplifier 928 may be coupled to the stereo audio CODEC 926 and a first stereo speaker 930 may be coupled to the first stereo amplifier 928. Additionally, a microphone amplifier 932 may be coupled to the stereo audio CODEC 926 and a microphone 934 may be coupled to the microphone amplifier 932. The general diagram of FIG. 9 further shows that a second stereo amplifier 936 may be coupled to the stereo audio CODEC 926 and a second stereo speaker 938 may be coupled to the second stereo amplifier 936. In a particular embodiment, stereo headphones 940 may also be coupled to the stereo audio CODEC 926.

The general diagram of FIG. 9 also illustrates that an 802.11 controller 942 may be coupled to the DSP 904 and an 802.11 antenna 944 may be coupled to the 802.11 controller 942. Moreover, a Bluetooth controller 946 may be coupled to the DSP 904 and a Bluetooth antenna 948 may be coupled to the Bluetooth controller 946. A USB controller 950 may be coupled to the DSP 904 and a USB port 952 may be coupled to the USB controller 950. Additionally, a smart card 954, e.g., a multimedia card (MMC) or a secure digital card (SD), may be coupled to the DSP 904. Further, a power supply 956 may be coupled to the on-chip system 902 and may provide power to the various components of the PDA 900.

As indicated in the general diagram of FIG. 9, the display 910, the keypad 912, the IrDA port 922, the digital camera 924, the first stereo speaker 930, the microphone 934, the second stereo speaker 938, the stereo headphones 940, the 802.11 antenna 944, the Bluetooth antenna 948, the USB port 952, and the power supply 956 may be external to the on-chip system 902 and coupled to one or more components on the on-chip system. In a particular embodiment, the Digital Signal Processor 904 includes a cache replacement system 980 to determine which cache lines of a cache of the processor 904 to replace with values from flash 914, ROM 916, DRAM 918, and/or EEPROM 920.

Figure 10:
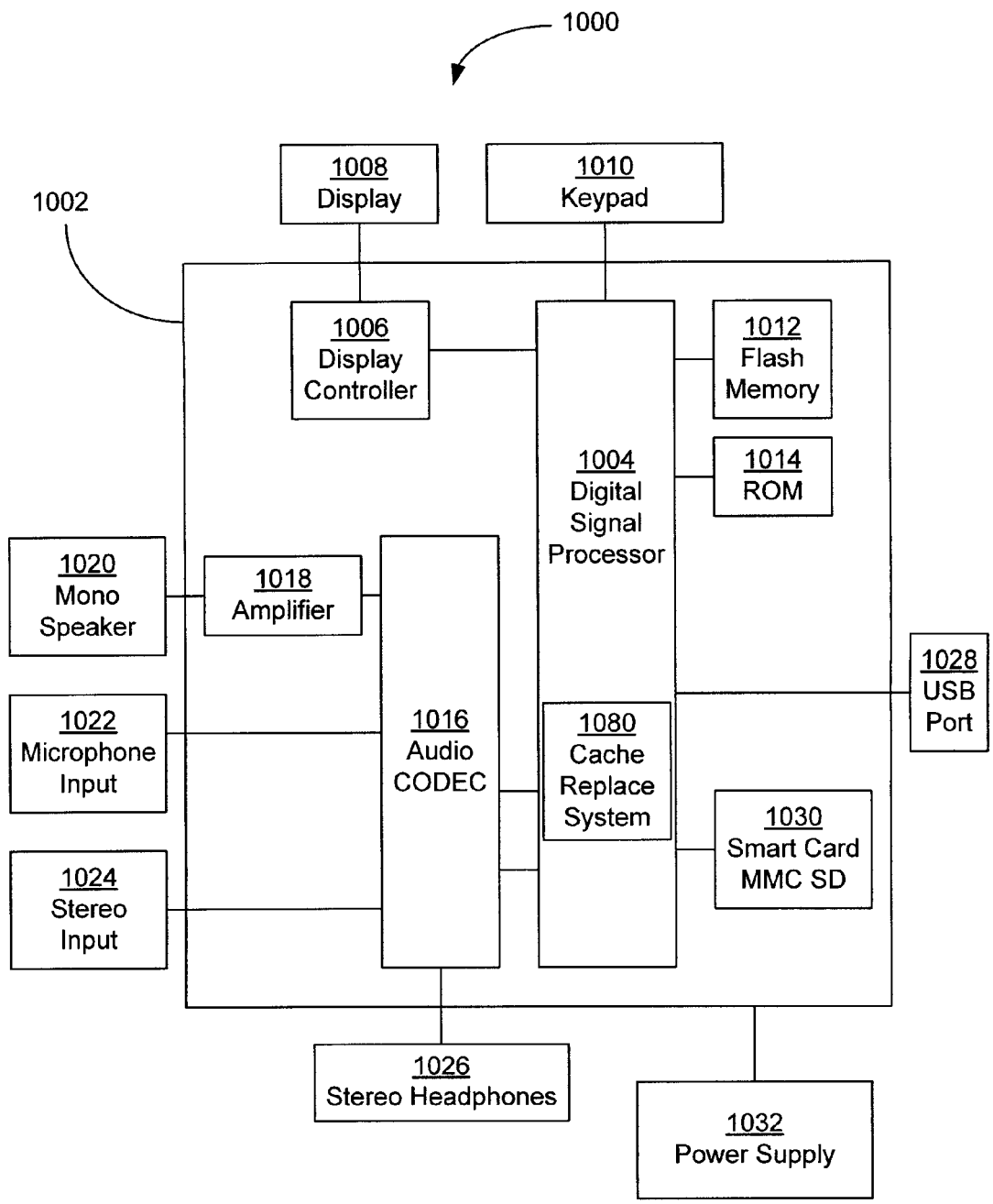
FIG. 10 is a general diagram illustrating an example audio file player incorporating a digital signal processor that may include a cache replacement system as illustrated in FIGS. 2-3.

FIG. 10 is a diagram illustrating an exemplary embodiment of an audio file player (e.g., MP3 player) 1000. As shown, the audio file player 1000 includes an on-chip system 1002 that includes a digital signal processor (DSP) 1004. A display controller 1006 may be coupled to the DSP 1004 and a display 1008 is coupled to the display controller 1006. In an exemplary embodiment, the display 1008 is a liquid crystal display (LCD). A keypad 1010 may be coupled to the DSP 1004.

As further depicted in the general diagram of FIG. 10, a flash memory 1012 and a read only memory (ROM) 1014 may be coupled to the DSP 1004. Additionally, in a particular embodiment, an audio CODEC 1016 may be coupled to the DSP 1004. An amplifier 1018 may be coupled to the audio CODEC 1016 and a mono speaker 1020 may be coupled to the amplifier 1018. The general diagram of FIG. 10 further indicates that a microphone input 1022 and a stereo input 1024 may also be coupled to the audio CODEC 1016. In a particular embodiment, stereo headphones 1026 may also be coupled to the audio CODEC 1016.

A USB port 1028 and a smart card 1030 may be coupled to the DSP 1004. Additionally, a power supply 1032 may be coupled to the on-chip system 1002 and may provide power to the various components of the audio file player 1000.

As indicated in the general diagram of FIG. 10, the display 1008, the keypad 1010, the mono speaker 1020, the microphone input 1022, the stereo input 1024, the stereo headphones 1026, the USB port 1028, and the power supply 1032 are external to the on-chip system 1002 and coupled to one or more components on the on-chip system 1002. In a particular embodiment, the Digital Signal Processor 1004 includes a cache replacement system 1080 to determine which cache lines of a cache of the processor 1004 to replace with values from flash 1012 and/or ROM 1014.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A system comprising:
a cache comprising a plurality of cache lines;
an identifier including an identifier value to identify a cache line of the plurality of cache lines for replacement;
a selector to receive an index value included in a cache invalidate by index instruction, an encoded way value outputted by an encoder, and an incrementer output value outputted by an incrementer; and
control logic configured to assign the identifier value from the selector, wherein the control logic assigns the index value to the identifier value in response to receiving the cache invalidate by index instruction.

2. A method comprising:
identifying, at an identifier, a cache line for replacement, wherein the cache line is included in a plurality of cache lines of a cache;
receiving, at a selector, an index value included in a cache invalidate by index instruction, an encoded way value outputted by an encoder, and an incrementer output value outputted by an incrementer; and
assigning an identifier value to the identifier from the selector, wherein the index value is assigned as the identifier value in response to receiving the cache invalidate by index instruction.

3. The method of claim 2, wherein the encoded way value outputted by the encoder is assigned as the identifier value in response to receiving a cache invalidate by address instruction and a cache hit.

4. The method of claim 3, wherein the encoded way value includes four bits.

5. The method of claim 3, wherein the encoder outputs the encoded way value based on a comparator output from a comparator, wherein the comparator output is determined based at least in part on a first comparison including an index of tags and a second comparison including an index of states.

6. The method of claim 5, wherein the first comparison determines whether a tag of the cache invalidate by address instruction matches a particular tag of the index of tags, wherein each tag of the index of tags corresponds to a particular cache line of the plurality of cache lines.

7. The method of claim 6, wherein the particular tag is associated with a predefined set of the index of tags.

8. The method of claim 7, wherein the predefined set is obtained from the cache invalidate by address instruction.

9. The method of claim 5, wherein the second comparison determines whether a particular tag of the index of tags is valid, wherein each state of the index of states corresponds to a particular cache line of the plurality of cache lines and indicates a validity of the particular cache line.

10. The method of claim 5, wherein the comparator output includes sixteen bits.

11. The method of claim 5, wherein the index of tags and the index of states are distinct indexes.

12. The method of claim 11, wherein the plurality of cache lines is not included in the index of tags.

13. The method of claim 2, wherein an existing value of the identifier is maintained as the identifier value of the identifier in response to receiving a cache invalidate by address instruction and a cache miss.

14. The method of claim 2, further comprising receiving a cache instruction.

15. The method of claim 14, further comprising:
determining whether the cache instruction is a cache maintenance instruction, wherein the cache maintenance instruction includes one of the cache invalidate by index instruction and a cache invalidate by address instruction; and
in response to a determination that the cache instruction is the cache maintenance instruction, determining whether the cache maintenance instruction is the cache invalidate by index instruction or the cache invalidate by address instruction.

16. The method of claim 15, further comprising identifying one of a cache miss associated with the cache instruction and a cache hit associated with the cache instruction in response to a determination that the received cache instruction is not the cache maintenance instruction.

17. The method of claim 16, wherein identifying the cache miss associated with the cache instruction and the cache hit associated with the cache instruction is based at least in part on a comparator output from a comparator.

18. The method of claim 16, wherein in response to identification of the cache miss associated with the cache instruction, the incrementer output value is assigned as the identifier value, wherein the incrementer output value is equal to:

a sum of the identifier value and an increment value in response to a cache miss based on the cache instruction that is not the cache maintenance instruction, and the identifier value in response to both a cache hit and a cache miss associated with the cache maintenance instruction, and in response to a cache hit based on the cache instruction that is not the cache maintenance instruction.

19. The method of claim 18, wherein in response to identification of the cache hit associated with the cache instruction, the incrementer output value is assigned as the identifier value.

20. A system comprising:

means for identifying an identifier indicating a cache line for replacement, wherein the cache line is included in a plurality of cache lines of a cache;

means for receiving an index value included in a cache invalidate by index instruction, an encoded way value outputted by an encoder, and an incrementer output value outputted by an incrementer; and means for assigning an identifier value to the identifier from the means for receiving, wherein the index value is assigned as the identifier value in response to receiving the cache invalidate by index instruction.

* * * * *